United States Patent
Hong (10) Patent No.: US 11,438,783 B2
(45) Date of Patent: Sep. 6, 2022

(54) METHOD, DEVICE AND SYSTEM FOR MEASUREMENT OF MINIMIZATION OF DRIVE TESTS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/962,002

(22) PCT Filed: Jan. 22, 2018

(86) PCT No.: PCT/CN2018/073623
§ 371 (c)(1),
(2) Date: Jul. 14, 2020

(87) PCT Pub. No.: WO2019/140684
PCT Pub. Date: Jul. 25, 2019

(65) Prior Publication Data
US 2021/0076242 A1    Mar. 11, 2021

(51) Int. Cl.
*H04W 24/10* (2009.01)
*H04W 4/80* (2018.01)
*H04W 84/12* (2009.01)

(52) U.S. Cl.
CPC .............. *H04W 24/10* (2013.01); *H04W 4/80* (2018.02); *H04W 84/12* (2013.01)

(58) Field of Classification Search
None
See application file for complete search history.

(56) References Cited

U.S. PATENT DOCUMENTS 8,903,410 B2 * 12/2014 Hapsari ................. H04W 24/10
455/450
9,277,437 B2 * 3/2016 Wu ........................ H04W 24/10
(Continued)

FOREIGN PATENT DOCUMENTS

CN    101998463 A    3/2011
CN    102761821 A    10/2012
(Continued)

OTHER PUBLICATIONS

Extended European Search Report dated Jun. 29, 2021 in European Patent Application No. 18901782.5, 12 pages.
(Continued)

*Primary Examiner* — Tri H Phan
(74) *Attorney, Agent, or Firm* — Oblon, McClelland, Maier & Neustadt, L.L.P.

(57) ABSTRACT

Aspects of the disclosure provide a method, device, and system for minimization of drive tests (MDT) measurement in the technical field of wireless communication. The method can include sending enquiry signaling to a target terminal device, the enquiry signaling being configured to enquire whether the target terminal device supports a target function. The method can further include receiving support status information corresponding to the target function, from the target terminal device, and sending MDT configuration information to the target terminal device in response to that the support status information indicates support. The disclosure may reduce or prevent waste of resources.

16 Claims, 4 Drawing Sheets

(56) References Cited

U.S. PATENT DOCUMENTS

| | | | |
|---|---|---|---|
| 9,319,917 B2* | 4/2016 | Tamura | H04L 43/0823 |
| 9,380,469 B2* | 6/2016 | Zou | H04W 24/08 |
| 9,516,518 B2* | 12/2016 | Liu | H04W 8/10 |
| 9,531,558 B2* | 12/2016 | Wu | H04W 72/005 |
| 9,955,410 B2* | 4/2018 | Li | H04W 24/10 |
| 10,356,704 B2* | 7/2019 | Li | H04W 48/16 |
| 2014/0155056 A1 | 6/2014 | Jactat et al. | |
| 2015/0045014 A1 | 2/2015 | Bodog et al. | |
| 2015/0201344 A1 | 7/2015 | Wu | |
| 2016/0044591 A1* | 2/2016 | Pao | H04W 48/12 370/329 |
| 2016/0119158 A1 | 4/2016 | Wu | |
| 2019/0141664 A1* | 5/2019 | Chang | H04W 48/16 |

FOREIGN PATENT DOCUMENTS

| | | |
|---|---|---|
| CN | 103686823 A | 3/2014 |
| CN | 103813451 A | 5/2014 |
| CN | 107277772 A | 10/2017 |
| CN | 107302793 A | 10/2017 |
| EP | 2 894 895 A1 | 7/2015 |
| WO | WO 2013/021832 A1 | 2/2013 |
| WO | WO 2015/105813 A2 | 7/2015 |

OTHER PUBLICATIONS

Indian Office Action dated Sep. 10, 2021 in Indian Patent Application No. 202047035571, 6 pages.
CMCC, "Introduce new measurement collection in MDT," 3GPP TSG-RAN WG2 Meeting #100, R2-1713257, XP051372038, 2017, 5 pages.
International Search Report and Written Opinion dated May 30, 2018 in PCT/CN2018/073623, 7 pages

* cited by examiner

METHOD, DEVICE AND SYSTEM FOR MEASUREMENT OF MINIMIZATION OF DRIVE TESTS

CROSS REFERENCE

This application is the 371 application of PCT Application No. PCT/CN2018/073623, filed on Jan. 22, 2018, the entire content of which is incorporated herein by reference.

TECHNICAL FIELD

The disclosure relates to the technical field of wireless communication, and particularly relates to a method, device and system for minimization of drive tests (MDT) measurement.

BACKGROUND

In the technical field of wireless communication, in order to optimize a mobile network, a minimization of drive tests (MDT) technology is generally used to obtain the relevant information required for optimizing the mobile network.

Specifically, in an indoor scene, a base station may send MDT configuration information to a terminal to be subjected to MDT. After the terminal receives the MDT configuration information, if the terminal supports a Bluetooth function or a wireless local area networks (WLAN) function, signal information of a mobile network where the terminal is at present may be measured, and present position determination information may be determined. The position determination information may be information of a Bluetooth device which generates a presently detected Bluetooth signal or information of a Wireless Fidelity (WiFi) device which generates a presently detected WiFi signal. Therefore, the measured signal information of the mobile network and the position determination information may be sent to the base station. Correspondingly, the base station may receive the signal information of the mobile network and the position determination information from the terminal, so as to obtain the information required for optimizing the mobile network.

However, related technologies can have problems. For example, based on the above processing manner, if the terminal receiving the MDT configuration information does not support the Bluetooth function or the WLAN function, the terminal cannot perform a measurement. That is, in this case, the MDT configuration information from the base station is not effective, which results in a waste of resources.

SUMMARY

Aspects of the present disclosure can reduce or avoid wasting resources. The disclosure describes a method, device, and system for MDT measurement. According to a first aspect of the disclosure, a method for MDT measurement is provided and can include sending an enquiry signaling that to a target terminal device, the enquiry signaling being configured to enquire whether the target terminal device supports a target function, receiving support status information corresponding to the target function from the target terminal device, and sending MDT configuration information to the target terminal device in response to that the support status information indicates support.

Optionally, the method may further include not sending the MDT configuration information to the target terminal device when the support status information indicates non-support.

Further, the target function may be a Bluetooth function and/or a WLAN function. The enquiry signaling may be UE capability enquiry signaling. The support status information can be carried in UE capability information signaling.

According to a second aspect of embodiments of the disclosure, a method for MDT measurement is provided and can include receiving enquiry signaling sent by a base station, the enquiry signaling being configured to enquire whether a target terminal device supports a target function, determining support status information corresponding to the target function, sending the support status information corresponding to the target function to the base station, and receiving MDT configuration information sent by the base station, wherein the MDT configuration information is configured to perform MDT measurement.

Optionally, the target function may be a Bluetooth function and/or a WLAN function. Further, the enquiry signaling may be UE capability enquiry signaling. The support status information may be carried in UE capability information signaling.

According to a third aspect of embodiments of the disclosure, a device for MDT measurement is provided. The device is a base station and includes a first sending module that is configured to send enquiry signaling to a target terminal device, the enquiry signaling being configured to enquire whether the target terminal device supports a target function, a receiving module that is configured to receive support status information corresponding to the target function from the target terminal device, and a second sending module that is configured to send MDT configuration information to the target terminal device in response to that the support status information indicates support.

Optionally, the device may further include a third sending module that is configured to not send MDT configuration information to the target terminal device in response to that the support status information indicates non-support.

Further, the target function may be a Bluetooth function and/or a WLAN function. The enquiry signaling may be UE capability enquiry signaling. The support status information may be carried in UE capability information signaling.

According to a fourth aspect of embodiments of the disclosure, a device for MDT measurement is provided. The device is a target terminal device and can include a first receiving module that is configured to receive enquiry signaling from a base station, the enquiry signaling being configured to enquire whether the target terminal device supports a target function, a determining module that is configured to determine support status information corresponding to the target function, a sending module that is configured to send the support status information corresponding to the target function to the base station, and a second receiving module that is configured to receive MDT configuration information from the base station, the MDT configuration information being configured to perform MDT measurement.

Optionally, the target function may be a Bluetooth function and/or a WLAN function. Further, the enquiry signaling may be UE capability enquiry signaling. The support status information may be carried in UE capability information signaling.

According to a fifth aspect of the disclosure, a base station is provided and includes a processor and a memory. The memory can be configured to store at least one instruction, at least one segment of program, a code set or an instruction set, and the at least one instruction, the at least one segment of program, the code set or the instruction set may be loaded and executed by the processor to implement the method for MDT measurement as described in the first aspect.

According to a sixth aspect of the disclosure, a target terminal device is provided and includes a processor and a memory. The memory can be configured to store at least one instruction, at least one segment of program, a code set or an instruction set, and the at least one instruction, the at least one segment of program, the code set or the instruction set may be loaded and executed by the processor to implement the method for MDT measurement as described in the second aspect.

According to a seventh aspect of the disclosure, a computer-readable storage medium is provided. The storage medium can be configured to store at least one instruction, at least one segment of program, a code set or an instruction set, and the at least one instruction, the at least one segment of program, the code set or the instruction set may be loaded and executed by the processor to implement the method for MDT measurement as described in the first aspect or the method for MDT measurement as described in the second aspect.

According to an eighth aspect of embodiments of the disclosure, a system for MDT measurement is provided and includes a base station and a target terminal device. The base station may be the base station as described in the third aspect or the fifth aspect. The target terminal device may be the target terminal device as described in the fourth aspect or the sixth aspect.

The technical solutions according to the embodiments of the disclosure can have advantages. For example, the embodiments of the disclosure, before sending MDT configuration information to target terminal device, a base station may send enquiry signaling configured to enquire whether the target terminal device supports a target function to the target terminal device, and after receiving the enquiry signaling, the target terminal device may send support status information corresponding to the target function to the base station. Correspondingly, after the base station receives the support status information corresponding to the target function from the target terminal device, the base station may send the MDT configuration information to the target terminal device in response to that the support status information indicates support, and after receiving the MDT configuration information, the target terminal device may perform MDT measurement. In this way, the base station only sends the MDT configuration information to the target terminal device which supports the target function and does not send the MDT configuration information to a terminal which cannot perform a measurement, thereby preventing waste of resources and avoiding wrong configuration.

BRIEF DESCRIPTION OF THE DRAWINGS

In order to more clearly illustrate the technical solutions in the embodiments of the disclosure, the drawings required for the embodiments will be briefly described below. It is apparent that the drawings in the following description are only some embodiments of the disclosure. Those skilled in the art can also obtain other drawings according to these drawings without any creative work.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of devices and methods consistent with some aspects of the disclosure as detailed in the appended claims.

Figure 1:
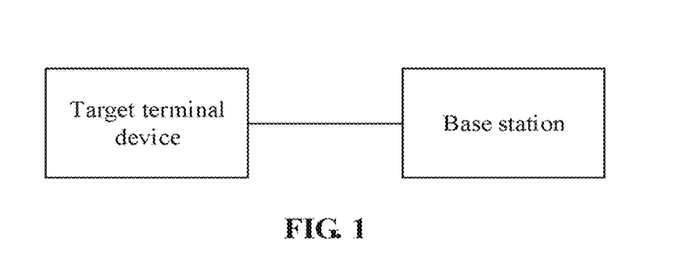
FIG. 1 is a schematic diagram of a system framework according to an embodiment of the disclosure.

An exemplary embodiment of the disclosure provides a method for MDT measurement. The method may be implemented by a base station together with a target terminal device. A system framework is shown in FIG. 1. The base station may be a base station in a wireless communication system, such as a base transceiver station (BTS) in GSM or CDMA, or an nodeB (NB) in WCDMA, or an evolutional node B (eNB or e-NodeB) in LTE. The target terminal device may also be referred to as user equipment (UE), a mobile station (MS), a mobile terminal, and the like. For example, the target terminal device may be a mobile phone (or called a cellular phone), and the like. For example, the target terminal device may also be a portable, pocket-sized, hand-held, computer-built-in or vehicle-mounted mobile device that can exchange language and/or data with a wireless access network.

After the base station sends enquiry signaling configured to enquire whether to support a target function to the target terminal device, the target terminal device may determine support status information corresponding to the target function and send the support status information corresponding to the target function to the base station. Correspondingly, after the base station receives the support status information from the target terminal device, the base station may send MDT configuration information to the target terminal device in response to that the support status information indicates support.

The base station may include components, such as a processor, a memory and a transceiver. The processor may be a central processing unit (CPU), and the like, and may be configured to perform corresponding processing according to the support status information corresponding to the target function and sent by the target terminal device. The memory may be a random access memory (RAM), a flash, and the like, and may be configured to store received data, data required for processing, data generated during processing, and the like, such as support status information. The transceiver may be configured to perform data transmission with the target terminal device or other devices (such as operator servers). For example, the transceiver may be configured to send the enquiry signaling and the MDT configuration information to the target terminal device and receive the support status information corresponding to the target function from the target terminal device. The transceiver may include an antenna, a matching circuit, a modem, and the like.

The target terminal device may include components, such as a processor, a memory and a transceiver. The processor may be a CPU, and the like, and may be configured to determine the support status information corresponding to the target function and perform MDT measurement. The memory may be an RAM, a flash, and the like, and may be configured to store received data, data required for processing, data generated during processing, and the like, such as MDT configuration information. The transceiver may be configured to perform data transmission with other devices. For example, the transceiver may be configured to receive, from the base station, the MDT configuration information and the enquiry signaling configured to enquire whether the target terminal device supports a target function, and send the support status information corresponding to the target function to the base station. The transceiver may include an antenna, a matching circuit, a modem, and the like.

Figure 2:
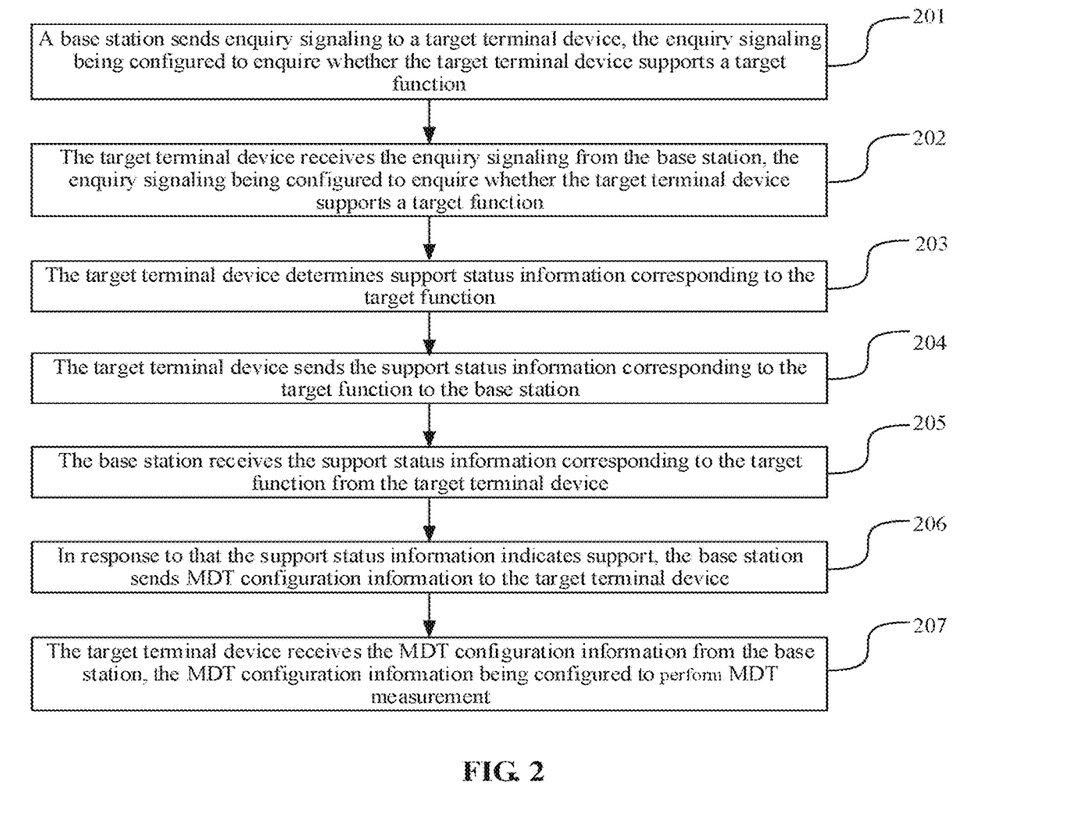
FIG. 2 is a schematic flow diagram of a method for MDT measurement according to an embodiment of the disclosure.

The processing flow as shown in FIG. 2 will be described in detail in conjunction with implementations below.

In operation 201, a base station sends enquiry signaling to a target terminal device, the enquiry signaling being configured to enquire whether the target terminal device supports a target function. The target terminal device may be any terminal device to be configured with MDT configuration information, and the target function may be a function about which the target terminal device is to be enquired whether it is supported.

Figure 3:
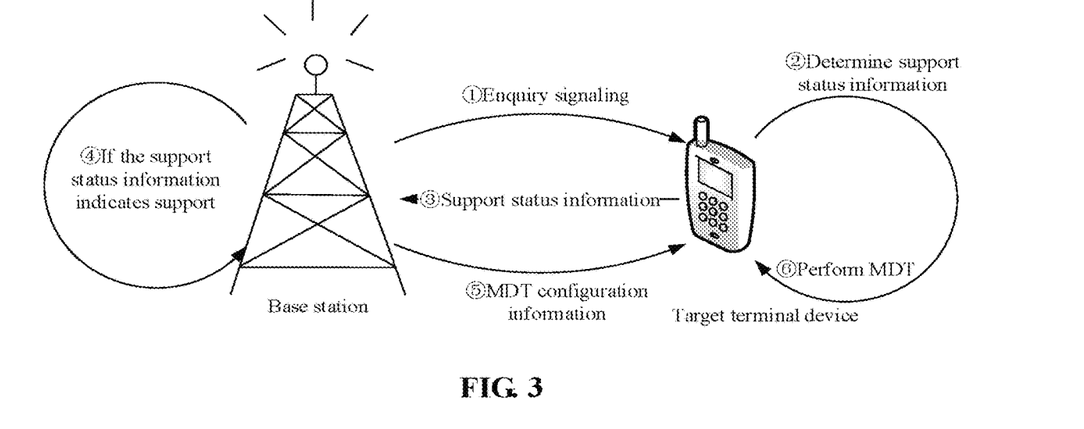
FIG. 3 is a schematic diagram of a system framework according to an embodiment of the disclosure.

In an implementation, in order to optimize a mobile network (or called a cellular network), an MDT technology is generally used to obtain relevant information required for optimizing the mobile network. Specifically, for a target terminal device to be configured with MDT configuration information, a base station may send enquiry signaling configured to enquire whether the target terminal device supports a target function to the target terminal device. As shown in FIG. 3, the enquiry signaling may be radio resource control (RRC) signaling. Optionally, the target function may be a function for assisting indoor positioning. For example, the target function may be a Bluetooth function, a WLAN function, or a Bluetooth function and a WLAN function. Further, the enquiry signaling is UE capability enquiry signaling.

In an implementation, for the target terminal device to be configured with MDT configuration information, the base station may send UE capability enquiry signaling to the target terminal device. The UE capability enquiry signaling may contain enquiry information configured to enquire whether the target terminal device supports a target function.

In operation 202, the target terminal device receives the enquiry signaling from the base station, the enquiry signaling being configured to enquire whether the target terminal device supports a target function. In an implementation, after the base station sends the enquiry signaling to the target terminal device, the target terminal device may receive the enquiry signaling configured to enquire whether the target terminal device supports a target function from the base station.

Optionally, the target function may be a function for assisting indoor positioning. For example, the target function may be a Bluetooth function, a WLAN function, or a Bluetooth function and a WLAN function.

In response to that the base station enquires whether the target terminal device supports a target function through the UE capability enquiry signaling, the enquiry signaling received by the target terminal device may be the UE capability enquiry signaling. In an implementation, after the base station sends UE capability enquiry signaling configured to enquire whether the target terminal device supports a Bluetooth function and/or a WLAN function to the target terminal device, the target terminal device may receive the UE capability enquiry signaling from the base station.

In operation 203, the target terminal device determines support status information corresponding to the target function. In an implementation, after receiving the enquiry signaling from the base station, the target terminal device may determine whether the target terminal device supports a target function. In response to that the target terminal device supports the target function (that is, the target function may be set in the target terminal device and indoor positioning may be performed through the target function), the terminal may determine that the support status information corresponding to the target function is support. In response to that the target terminal device does not support the target function, the target terminal device may determine that the support status information corresponding to the target function is non-support. The form of the support status information is not limited. For example, when the target terminal device supports the target function, the target terminal device may determine 1 as the support status information corresponding to the target function; and when the target terminal device does not support the target function, the target terminal device may determine 0 as the support status information corresponding to the target function.

In operation 204, the target terminal device sends the support status information corresponding to the target function to the base station. In an implementation, after determining the support status information corresponding to the target function, the target terminal device may send the support status information corresponding to the target function to the base station. Optionally, the support status information is carried in UE capability information signaling.

In an implementation, after determining the support status information corresponding to the target function, the target terminal device may send UE capability information signaling to the base station, the UE capability information signaling including the support status information corresponding to the target function.

In operation 205, the base station receives the support status information corresponding to the target function from the target terminal device. In an implementation, after the target terminal device sends the support status information corresponding to the target function to the base station, the base station may receive the support status information corresponding to the target function from the target terminal device. Optionally, the support status information may be carried in UE capability information signaling.

In an implementation, in response to that the target terminal device sends the support status information corresponding to the target function to the base station through the UE capability information signaling, the base station may receive the UE capability information signaling containing the support status information from the target terminal device.

In operation 206, in response to that the support status information indicates support, the base station sends MDT configuration information to the target terminal device. In an implementation, after receiving the support status information corresponding to the target function from the target terminal device, the base station may determine whether the target terminal device supports a target function according to the support status information sent by the target terminal device. When the target terminal device supports the target function (that is, in response to that the support status information indicates support), the base station may send MDT configuration information to the target terminal device, the MDT configuration information being configured to indicate the target terminal device to perform MDT measurement, and the MDT configuration information may include parameters for the target terminal device to perform MDT measurement. Optionally, in response to that the support status information indicates non-support, the MDT configuration information is not sent to the target terminal device.

In an implementation, when the target terminal device does not support the target function (that is, in response to that the support status information indicates non-support), the base station may not send MDT configuration information to the target terminal device. In response to that the support status information is represented as 1 or 0, the base station may analyze the support status information after receiving the support status information corresponding to the target function from the target terminal device. When the support status information is 1, the base station may determine that the target terminal device supports the target function; and when the support status information is 0, the base station may determine that the target terminal device does not support the target function.

In other words, in this solution, before sending the MDT configuration information to the target terminal device, the base station may send the enquiry signaling configured to enquire whether the target terminal device supports the target function to the target terminal device to determine whether the target terminal device supports the target function, and then, whether to send the MDT configuration information to be target terminal device may be determined according to the enquiry result. In response to that the support status information indicates support, the base station may send the MDT configuration information to the target terminal device. In response to that the support status information indicates non-support, the MDT configuration information may be not sent to the target terminal device, thereby avoiding sending the MDT configuration information to a terminal which does not support the target function, and thus further avoiding waste of resources and wrong configuration and enhancing the accuracy of MDT configuration.

In operation 207, the target terminal device receives the MDT configuration information from the base station, the MDT configuration information being configured to perform MDT measurement. In an implementation, after the base station sends the MDT configuration information to the target terminal device, the target terminal device may receive the MDT configuration information from the base station, so that the MDT may be performed based on the MDT configuration information. Specifically, after the target terminal device receives the MDT configuration information, the signal information of a mobile network at a position where the target terminal device is located at present may be measured, and the present position determination information may be determined through the target function, so that the measured signal information of the mobile network and position determination information may be sent to the base station. When the target function includes a Bluetooth function, the target terminal device may measure the information of a Bluetooth device which generates the presently detected Bluetooth signal through the Bluetooth function. When the target function includes a WLAN function, the target terminal device may measure the information of a WiFi device which generates the presently detected WiFi signal through the WLAN function.

In the embodiments of the disclosure, before sending the MDT configuration information to the target terminal device, the base station may send the enquiry signaling configured to enquire whether the target terminal device supports the target function to the target terminal device, and after receiving the enquiry signaling, the target terminal device may send the support status information corresponding to the target function to the base station. Correspondingly, after the base station receives the support status information corresponding to the target function from the target terminal device, the base station may send the MDT configuration information to the target terminal device in response to that the support status information indicates support, and after receiving the MDT configuration information, the target terminal device may perform MDT measurement. In this way, the base station only sends the MDT configuration information to the target terminal device which supports the target function to avoid sending the MDT configuration information to a terminal which cannot perform a measurement, thereby preventing waste of resources and wrong configuration and enhancing the accuracy of MDT configuration.

Figure 4A:
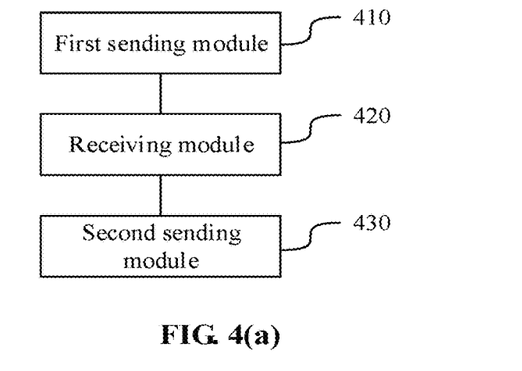
FIG. 4(a) is a schematic structural diagram of a device for MDT measurement according to an embodiment of the disclosure.

Based on the same technical concept, another exemplary embodiment of the disclosure provides a device for MDT measurement. The device may be the above base station. As shown in FIG. 4(*a*), the device can include a first sending module 410 that is configured to send enquiry signaling to a target terminal device, the enquiry signaling being configured to enquire whether the target terminal device supports a target function, a receiving module 420 that is configured to receive support status information corresponding to the target function from the target terminal device, and a second sending module 430 that is configured to send MDT configuration information to the target terminal device in response to that the support status information indicates support.

Figure 4B:
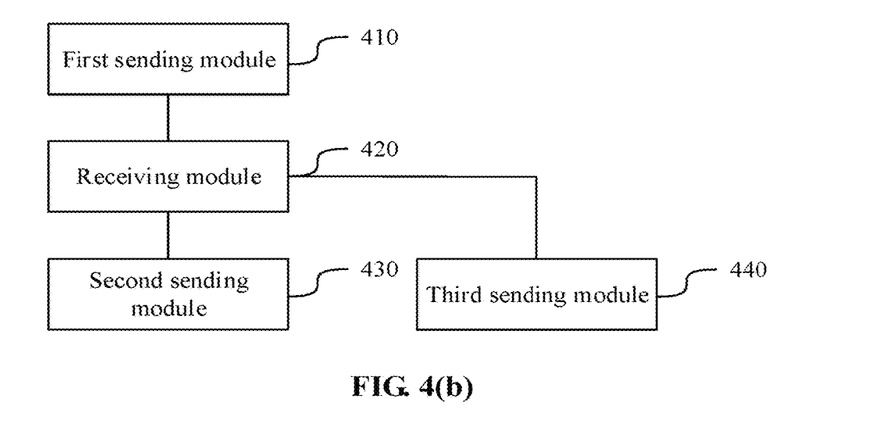
FIG. 4(b) is a schematic structural diagram of a device for MDT measurement according to an embodiment of the disclosure.

Optionally, as shown in FIG. 4(*b*), the device may further include a third sending module 440 that is configured to not send MDT configuration information to the target terminal device in response to that the support status information indicates non-support.

Further, the target function can be a Bluetooth function and/or a wireless local area networks (WLAN) function. Further, the enquiry signaling is UE capability enquiry signaling. The support status information can be carried in UE capability information signaling.

Figure 5:
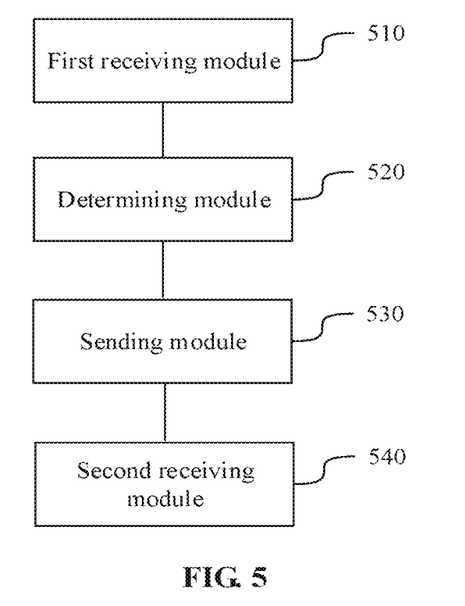
FIG. 5 is a schematic structural diagram of a device for MDT measurement according to an embodiment of the disclosure.

Based on the same technical concept, another exemplary embodiment of the disclosure provides a device for MDT measurement. The device may be the above target terminal device. As shown in FIG. 5, the device can include a first receiving module 510 that is configured to receive enquiry signaling from a base station, the enquiry signaling being configured to enquire whether the target terminal device supports a target function, and a determining module 520 that is configured to determine support status information corresponding to the target function. The device can further include a sending module 530 that is configured to send the support status information corresponding to the target function to the base station, and a second receiving module 540 that is configured to receive MDT configuration information from the base station, the MDT configuration information being configured to perform MDT measurement.

Optionally, the target function may be a Bluetooth function and/or a WLAN function. Further, the enquiry signaling may be UE capability enquiry signaling. The support status information may be carried in UE capability information signaling.

In the embodiments of the disclosure, before sending the MDT configuration information to the target terminal device, the base station may send the enquiry signaling configured to enquire whether the target terminal device supports the target function to the target terminal device, and after receiving the enquiry signaling, the target terminal device may send the support status information corresponding to the target function to the base station. Correspondingly, after the base station receives the support status information corresponding to the target function, from the target terminal device, the base station may send the MDT configuration information to the target terminal device in response to that the support status information indicates support, and after receiving the MDT configuration information, the target terminal device may perform MDT measurement. In this way, the base station only sends the MDT configuration information to the target terminal device which supports the target function to avoid sending the MDT configuration information to a terminal which cannot perform a measurement, thereby preventing waste of resources and avoiding wrong configuration.

It should be noted that when the device for MDT measurement according to the above embodiment performs MDT, the division of the above functional modules is used as an example only for illustration. In practical applications, the above function allocation can be made by different functional modules according to needs, that is, the internal structures of the base station and the target terminal device can be divided into different functional modules to complete all or part of the functions described above. In addition, the device for MDT measurement according to the above embodiment and the method embodiment for MDT measurement belong to the same concept, and specific implementation processes are described in detail in the method embodiment and will not be described here.

Based on the same technical concept, another exemplary embodiment of the disclosure provides a system for MDT measurement, and the system includes a base station and a target terminal device.

The base station is configured to send enquiry signaling to the target terminal device, the enquiry signaling being configured to enquire whether the target terminal device supports a target function; receive support status information corresponding to the target function from the target terminal device; and send MDT configuration information to the target terminal device in response to that the support status information indicates support.

The target terminal device is configured to receive the enquiry signaling from the base station, determine support status information corresponding to the target function, send the support status information corresponding to the target function to the base station, and receive MDT configuration information from the base station, the MDT configuration information being configured to perform MDT measurement.

In the embodiments of the disclosure, before sending the MDT configuration information to the target terminal device, the base station may send the enquiry signaling configured to enquire whether the target terminal device supports the target function to the target terminal device, and after receiving the enquiry signaling, the target terminal device may send the support status information corresponding to the target function to the base station. Correspondingly, after the base station receives the support status information corresponding to the target function from the target terminal device, the base station may send the MDT configuration information to the target terminal device in response to that the support status information indicates support, and ater receiving the MDT configuration information, the target terminal device may perform MDT measurement. In this way, the base station only sends the MDT configuration information to the target terminal device which supports the target function to avoid sending the MDT configuration information to a terminal which cannot perform a measurement, thereby preventing waste of resources and avoiding wrong configuration.

Figure 6:
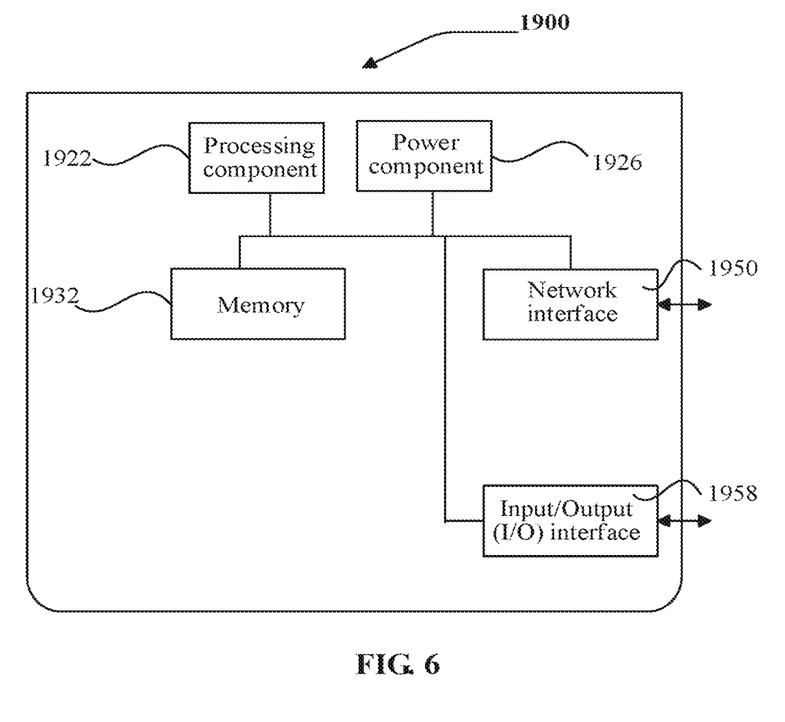
FIG. 6 is a schematic structural diagram of a base station according to an embodiment of the disclosure.

FIG. 6 is a block diagram of a device 1900 for MDT measurement according to an exemplary embodiment. For example, the device 1900 may be provided as a base station. Referring to FIG. 6, the device 1900 includes a processing component 1922 further including one or more processors, and memory resources represented by a memory 1932 for storing instructions executable by the processing component 1922, such as application programs. The application programs stored in the memory 1932 may include one or more modules, each of which corresponds to a set of instructions. Furthermore, the processing component 1922 is configured to execute the instructions to implement the above method for MDT measurement.

The device 1900 may also include a power supply component 1926 configured to execute power management of the device 1900, a wired or wireless network interface 1950 configured to connect the device 1900 to the network, and an input/output (I/O) interface 1958. The device 1900 may operate an operating system stored in the memory 1932, such as Windows Server™, Mac OS X™, Unix™, Linux™, FreeBSD™, or the like.

The device 1900 may include a memory and one or more programs. One or more programs have been stored in the memory and are configured to execute instructions for performing the following operations, included in one or more programs, by one or more processors, including sending enquiry signaling to a target terminal device, the enquiry signaling being configured to enquire whether the target terminal device supports a target function, receiving support status information corresponding to the target function from the target terminal device, and sending MDT configuration information to the target terminal device in response to that the support status information indicates support.

Optionally, the method may further include not sending the MDT configuration information to the target terminal device in response to that the support status information indicates non-support.

The target function may be a Bluetooth function and/or a WLAN function. Further, the enquiry signaling may be UE capability enquiry signaling. The support status information may be carried in UE capability information signaling.

In an exemplary embodiment, a non-transitory computer-readable storage medium is further provided. The storage medium is configured to store at least one instruction, at least one segment of program, a code set or an instruction set, and the at least one instruction, the at least one segment of program, the code set or the instruction set are loaded and executed by the processor to implement the method for MDT measurement as described above.

In the embodiments of the disclosure, before sending the MDT configuration information to the target terminal device, the base station may send the enquiry signaling configured to enquire whether the target terminal device supports the target function to the target terminal device, and after receiving the enquiry signaling, the target terminal device may send the support status information corresponding to the target function to the base station. Correspondingly, after the base station receives the support status information corresponding to the target function from the target terminal device, the base station may send the MDT configuration information to the target terminal device in response to that the support status information indicates support, and after receiving the MDT configuration information, the target terminal device may perform MDT measurement. In this way, the base station only sends the MDT configuration information to the target terminal device which supports the target function and avoids sending the MDT configuration information to a terminal which cannot perform a measurement, thereby preventing waste of resources and avoiding wrong configuration.

Figure 7:
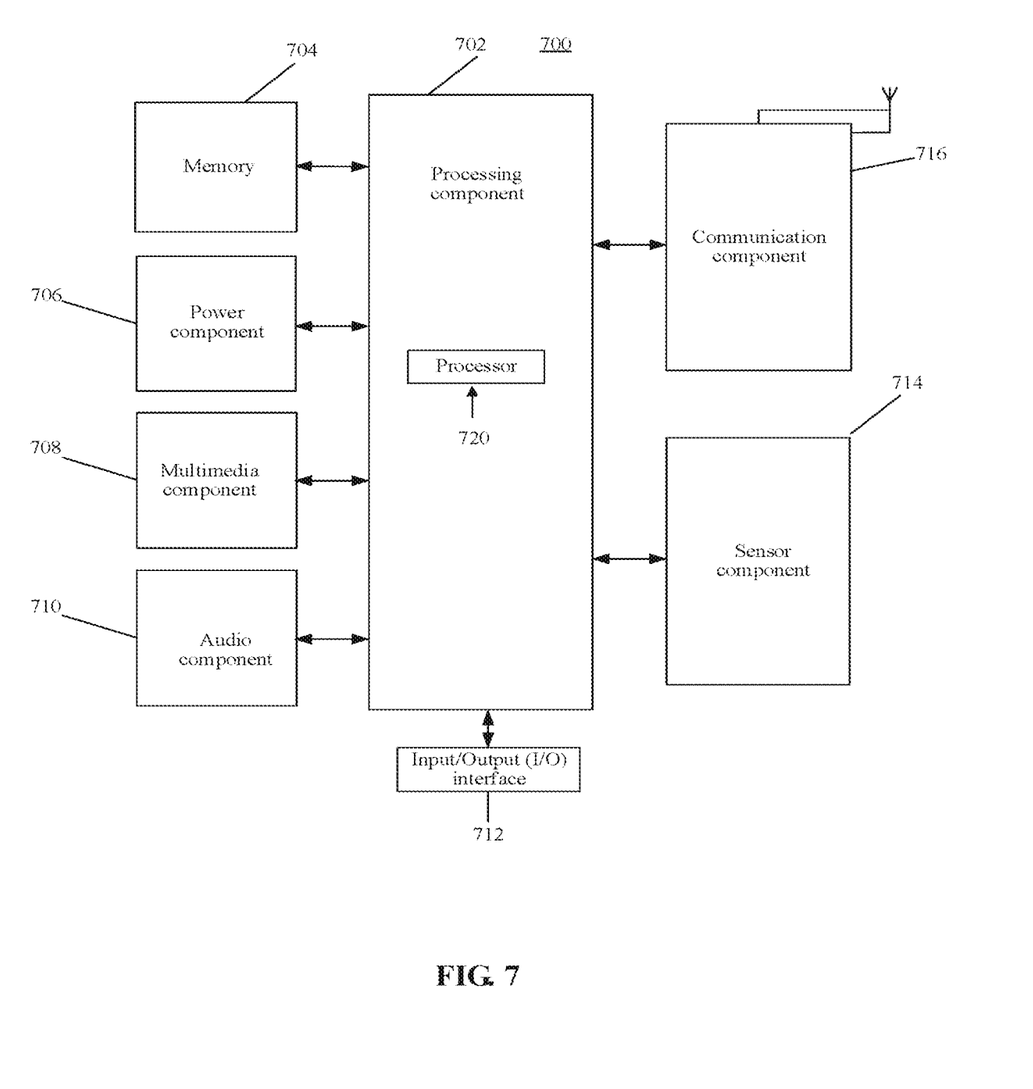
FIG. 7 is a schematic structural diagram of target user equipment according to an embodiment of the disclosure.

An embodiment of the disclosure further shows a schematic structural diagram of a terminal device. The terminal device may be the above target terminal device, such as a mobile phone or a tablet computer.

Referring to FIG. 7, the terminal device 700 may include one or more of the following components a processing component 702, a memory 704, a power component 706, a multimedia component 708, an audio component 710, an Input/Output (I/O) interface 712, a sensor component 714, and a communication component 716.

The processing component 702 is typically configured to control overall operations of the terminal device 700, such as operations associated with display, telephone calls, data communications, camera operations, and recording operations. The processing component 702 may include one or more processors 720 to execute instructions, so as to complete all or part of the operations of the method described above. In addition, the processing component 702 may include one or more modules to facilitate the interaction between the processing component 702 and other components. For example, the processing component 702 may include a multimedia module to facilitate interaction between the multimedia component 708 and the processing component 702.

The memory 704 is configured to store various types of data to support the operation of the terminal device 700. Examples of such data include instructions for any applications or methods operated on the terminal device 700, contact data, phonebook data, messages, pictures, video, etc. The memory 704 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 is configured to provide power to various components of the terminal device 700. The power component 706 may include a power management system, one or more power sources, and any other components associated with the generation, management, and distribution of power in the audio output device 700.

The multimedia component 708 may include a screen providing an output interface between the terminal device 700 and a user. In some embodiments, the screen may include a Liquid Crystal Display (LCD) and a Touch Panel (TP). If the screen includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 708 includes a front camera and/or a rear camera. The front camera and/or the rear camera may receive external multimedia data while the terminal device 700 is in an operation mode, such as a photographing mode or a video mode. Each front camera and each rear camera may be fixed optical lens systems or may have focal lengths and optical zoom capabilities.

The audio component 710 is configured to output and/or input audio signals. For example, the audio component 710 includes a Microphone (MIC) configured to receive an external audio signal when the audio output device 700 is in an operation mode, such as a call mode, a recording mode, and a voice recognition mode. The received audio signals may be further stored in the memory 704 or transmitted via the communication component 716.

The I/O interface 712 may provide an interface between the processing component 702 and peripheral interface modules which may be keyboards, click wheels, buttons, etc. These buttons may include, but not limited to: a home button, a volume button, a start button, and a lock button.

The sensor component 714 may include one or more sensors for providing status assessments of various aspects of the terminal device 700. For instance, the sensor component 714 may detect an on/off status of the terminal device 700, relative positioning of components, e.g., the display and the keypad, of the terminal device 700, a change in position of the terminal device 700 or a component of the terminal device 700, a presence or absence of user contact with the terminal device 700, an orientation or an acceleration/deceleration of the terminal device 700, and a change in temperature of the terminal device 700. The sensor component 714 may include a proximity sensor configured to detect the presence of objects nearby without any physical contact. The sensor component 714 may also include light sensors, such as CMOS or CCD image sensors, for use in imaging applications. In some embodiments, the sensor component 714 may also include an acceleration sensor, a gyroscope sensor, a magnetic sensor, a pressure sensor, or a temperature sensor.

The communication component 716 is configured to facilitate a wired or wireless communication between the terminal device 700 and other devices. The terminal device 700 may access a wireless network based on a communication standard, such as WiFi, 2G or 3G, or a combination thereof. In an exemplary embodiment, the communication component 716 receives a broadcast signal or broadcast related information from an external broadcast management system via a broadcast channel. In one exemplary embodiment, the communication component 716 may further include a near field communication (NFC) module to promote short-range communications. For example, the NFC module may be implemented based on a radio frequency identification (RFID) technology, an infrared data association (IrDA), an ultra-wide band (UWB) technology, a Bluetooth (BT) technology, and other technologies.

In exemplary embodiments, the terminal device 700 may be implemented with one or more application specific integrated circuits (ASICs), digital signal processors (DSPs), digital signal processing devices (DSPDs), programmable logic devices (PLDs), field programmable gate arrays (FP- GAs), controllers, micro-controllers, microprocessors, or other electronic elements, for performing the above described methods.

In exemplary embodiments, there is also provided a non-transitory computer-readable storage medium including instructions, such as included in the memory 704, executable by the processor 720 in the terminal device 70, for performing the above described methods. For example, the non-transitory computer-readable storage medium may be an ROM, an RAM, a CD-ROM, a magnetic tape, a floppy disk, an optical data storage device, and the like.

A non-transitory computer-readable storage medium is provided. When instructions in the storage medium is executed by a processor of a terminal, the terminal may execute the method for MDT measurement. The method includes receiving enquiry signaling from a base station, the enquiry signaling being configured to enquire whether a target terminal device supports a target function, and determining support status information corresponding to the target function. The method can further include sending the support status information corresponding to the target function to the base station, and receiving MDT configuration information from the base station, the MDT configuration information being configured to perform MDT measurement.

The target function may be a Bluetooth function and/or a WLAN function. Further, the enquiry signaling may be UE capability enquiry signaling. The support status information may be carried in UE capability information signaling.

In the embodiments of the disclosure, before sending the MDT configuration information to the target terminal device, the base station may send the enquiry signaling configured to enquire whether the target terminal device supports the target function to the target terminal device, and after receiving the enquiry signaling, the target terminal device may send the support status information corresponding to the target function to the base station. Correspondingly, after the base station receives the support status information corresponding to the target function from the target terminal device, the base station may send the MDT configuration information to the target terminal device in response to that the support status information indicates support, and after receiving the MDT configuration information, the target terminal device may perform MDT measurement. In this way, the base station only sends the MDT configuration information to the target terminal device which supports the target function to avoid sending the MDT configuration information to a terminal which cannot perform a measurement, thereby preventing waste of resources and avoiding wrong configuration.

Those of ordinary skill in the art may understand that all or part of the operations to implement the above embodiments may be completed by hardware, and may also be completed by a program instructing related hardware. The program may be stored in a computer-readable storage medium. The above-mentioned storage medium may be an ROM, a magnetic disk, an optical disk, and the like.

The above embodiments are merely preferred embodiments of the disclosure and are not intended to limit the disclosure. Any modification, equivalent replacement and improvement made within the spirit and principle of the disclosure are intended to be included within the scope of protection of the disclosure.

What is claimed is:

1. A method for minimization of drive tests (MDT) measurement, comprising:
    sending enquiry signaling to a target terminal device, the enquiry signaling being configured to enquire whether the target terminal device supports a target function;
    receiving support status information corresponding to the target function from the target terminal device; and
    sending MDT configuration information to the target terminal device in response to the support status information indicates support,
    wherein the target function is a function for assisting indoor positioning, and the target function comprises at least one of a bluetooth function or a wireless local area network (WLAN) function,
    when the target function comprises the bluetooth function, the target terminal device measures information of a bluetooth device which generates a presently detected Bluetooth signal through the bluetooth function, and
    when the target function comprises the WLAN function, the target terminal device measures information of a wireless fidelity (WiFi) device which generates a presently detected WiFi signal through the WLAN function.

2. The method of claim 1, further comprising:
    not refraining from sending the MDT configuration information to the target terminal device in response to the support status information indicates non-support.

3. The method of claim 1, wherein the enquiry signaling is UE capability enquiry signaling.

4. The method of claim 1, wherein the support status information is carried in UE capability information signaling.

5. A non-transitory computer-readable storage medium, wherein the storage medium is configured to store an instruction that is executed by a processor to implement the method for minimization of drive tests (MDT) measurement of claim 1.

6. A method for minimization of drive tests (MDT) measurement, comprising:
    receiving enquiry signaling from a base station, the enquiry signaling being configured to enquire whether a target terminal device supports a target function;
    determining support status information corresponding to the target function;
    sending the support status information corresponding to the target function to the base station; and
    receiving minimization of drive tests (MDT) configuration information from the base station, the MDT configuration information being configured to perform MDT measurement,
    wherein the target function is a function for assisting indoor positioning, and the target function comprises at least one of a bluetooth function or a wireless local area network (WLAN) function,
    when the target function comprises the bluetooth function, the target terminal device measures information of a bluetooth device which generates a presently detected Bluetooth signal through the bluetooth function, and
    when the target function comprises the WLAN function, the target terminal device measures information of a wireless fidelity (WiFi) device which generates a presently detected WiFi signal through the WLAN function.

7. The method of claim 6, wherein the enquiry signaling is UE capability enquiry signaling.

8. The method of claim 6, wherein the support status information is carried in UE capability information signaling.

9. A non-transitory computer-readable storage medium, wherein the storage medium is configured to store an instruction that is executed by a processor to implement the method for minimization of drive tests (MDT) measurement of claim 6.

10. A device for minimization of drive tests (MDT) measurement, comprising:
a processor; and
a memory that is configured to store instructions that are executable by the processor,
wherein the processor is configured to:
send enquiry signaling to a target terminal device, the enquiry signaling being configured to enquire whether the target terminal device supports a target function;
receive support status information corresponding to the target function from the target terminal device; and
send MDT configuration information to the target terminal device in response to that the support status information indicates support,
wherein the target function is a function for assisting indoor positioning, and the target function comprises at least one of a bluetooth function or a wireless local area network (WLAN) function,
when the target function comprises the bluetooth function, the target terminal device measures information of a bluetooth device which generates a presently detected Bluetooth signal through the bluetooth function, and
when the target function comprises the WLAN function, the target terminal device measures information of a wireless fidelity (WiFi) device which generates a presently detected WiFi signal through the WLAN function.

11. The device of claim 10, wherein the processor is further configured to:
refrain from sending MDT configuration information to the target terminal device in response to that the support status information indicates non-support.

12. The device of claim 10, wherein the enquiry signaling is UE capability enquiry signaling.

13. The device of claim 10, wherein the support status information is carried in UE capability information signaling.

14. A device for minimization of drive tests (MDT) measurement, comprising:
a processor; and
a memory that is configured to store an instruction executable by the processor;
wherein the processor includes:
a first receiving module that is configured to receive enquiry signaling from a base station, the enquiry signaling being configured to enquire whether the target terminal device supports a target function;
a determining module that is configured to determine support status information corresponding to the target function;
a sending module that is configured to send the support status information corresponding to the target function to the base station; and
a second receiving module that is configured to receive MDT configuration information from the base station, the MDT configuration information being configured to perform MDT measurement,
wherein the target function is a function for assisting indoor positioning, and the target function comprises at least one of a bluetooth function or a wireless local area network (WLAN) function,
when the target function comprises the bluetooth function, the target terminal device measures information of a bluetooth device which generates a presently detected Bluetooth signal through the bluetooth function, and
when the target function comprises the WLAN function, the target terminal device measures information of a wireless fidelity (WiFi) device which generates a presently detected WiFi signal through the WLAN function.

15. The method of claim 14, wherein the enquiry signaling is UE capability enquiry signaling.

16. The method of claim 14, wherein the support status information is carried in UE capability information signaling.

* * * * *